(12) United States Patent
Rajala

(10) Patent No.: US 9,773,392 B2
(45) Date of Patent: Sep. 26, 2017

(54) OFFENDER MONITOR WITH MANAGED RATE OF LOCATION READING

(71) Applicant: Numerex Corp., Atlanta, GA (US)

(72) Inventor: Yoganand Rajala, Alpharetta, GA (US)

(73) Assignee: Numerex Corp., Atlanta, GA (US)

(*) Notice: Subject to any disclaimer, the term of this patent is extended or adjusted under 35 U.S.C. 154(b) by 452 days.

(21) Appl. No.: 14/524,232

(22) Filed: Oct. 27, 2014

(65) Prior Publication Data

US 2016/0116596 A1 Apr. 28, 2016

(51) Int. Cl.
*G01S 19/16* (2010.01)
*G08B 21/02* (2006.01)
*G08B 25/10* (2006.01)
*G01S 19/14* (2010.01)
*G01S 5/02* (2010.01)

(52) U.S. Cl.
CPC .......... *G08B 21/02* (2013.01); *G01S 5/0263* (2013.01); *G01S 19/14* (2013.01); *G08B 21/0269* (2013.01); *G08B 25/10* (2013.01)

(58) Field of Classification Search
CPC ........ G01S 19/16; G01S 19/14; G01S 5/0263; G08B 21/02; G08B 21/0269; G08B 25/10
USPC .................................................... 342/357.54
See application file for complete search history.

(56) References Cited

U.S. PATENT DOCUMENTS

| | | | |
|---|---|---|---|
| 2006/0211430 A1* | 9/2006 | Persico | G01S 5/0263 455/456.1 |
| 2008/0186197 A1* | 8/2008 | Rochelle | G08B 21/0261 340/686.6 |
| 2013/0103960 A1* | 4/2013 | Alberth | G06F 1/3212 713/320 |
| 2013/0311123 A1* | 11/2013 | Nieminen | G01C 25/00 702/94 |
| 2014/0256357 A1* | 9/2014 | Wang | H04W 4/02 455/456.3 |
| 2015/0053144 A1* | 2/2015 | Bianchi | A01K 15/021 119/720 |
| 2016/0100522 A1* | 4/2016 | Yamauchi | G05D 1/0236 701/25 |

* cited by examiner

*Primary Examiner* — Harry Liu
(74) *Attorney, Agent, or Firm* — King & Spalding LLP

(57) ABSTRACT

A portable device, for example an offender monitor, can utilize a location detector, such as a GPS receiver, to provide location information for the device. The portable device can utilize geofences in connection with managing device location and can communicate over a cellular network, for example using a radio to transmit location readings over the network. The location detector and the radio can draw power from an onboard battery. To conserve battery life, the rate of acquiring location readings can be adjusted according to distance between the device and a geofence of interest. For example, a GPS data acquisition rate can increase as the device approaches a geofence and decrease as the device moves away from the geofence.

21 Claims, 5 Drawing Sheets

OFFENDER MONITOR WITH MANAGED RATE OF LOCATION READING

TECHNICAL FIELD

The present technology relates generally to offender monitors for tracking locations of offenders, and more particularly to adjusting location monitoring parameters in connection with extending battery life.

BACKGROUND

A variety of devices incorporate location detectors, such as global positioning system (GPS) receivers, for determining location. Many such devices have power constraints, and the location detector, when activated to take a location reading, consumes a substantial portion of the device's power budget. For example, for battery-operated devices, operating a GPS receiver can substantially shorten battery life, resulting in inconveniently frequent recharges or loss of service when battery energy is exhausted. The issue for wearable devices, such as offender locators, is particularly acute since the battery is typically small. Additionally, if the battery power of an offender monitor is exhausted, the offender may have an opportunity to go to an impermissible location or to otherwise perform an impermissible act that would otherwise be detected and reported by the offender monitor.

Accordingly, there are needs in the art for managing location detection. For example, need exists for controlling location acquisition rate to manage electrical power consumption. A technology addressing such a need, or some related deficiency in the art, would result in benefits that may include better portability, extended life, fewer recharges, or higher reliability, for example.

SUMMARY

A portable device can comprise a location detector, such as a GPS receiver, that provides location information about the device and a radio for communicating over a cellular network. An onboard battery can power the location detector and the radio. The location detector can be activated on a variable or as-needed basis. For example, to conserve battery life, the rate of acquiring location readings can be adjusted according to distance between the device and an area of interest. For example, location data acquisition rate can increase as the device approaches a geofence and decrease as the device moves away from the geofence.

The foregoing discussion of managing utilization of a location detector is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

Figure 1:
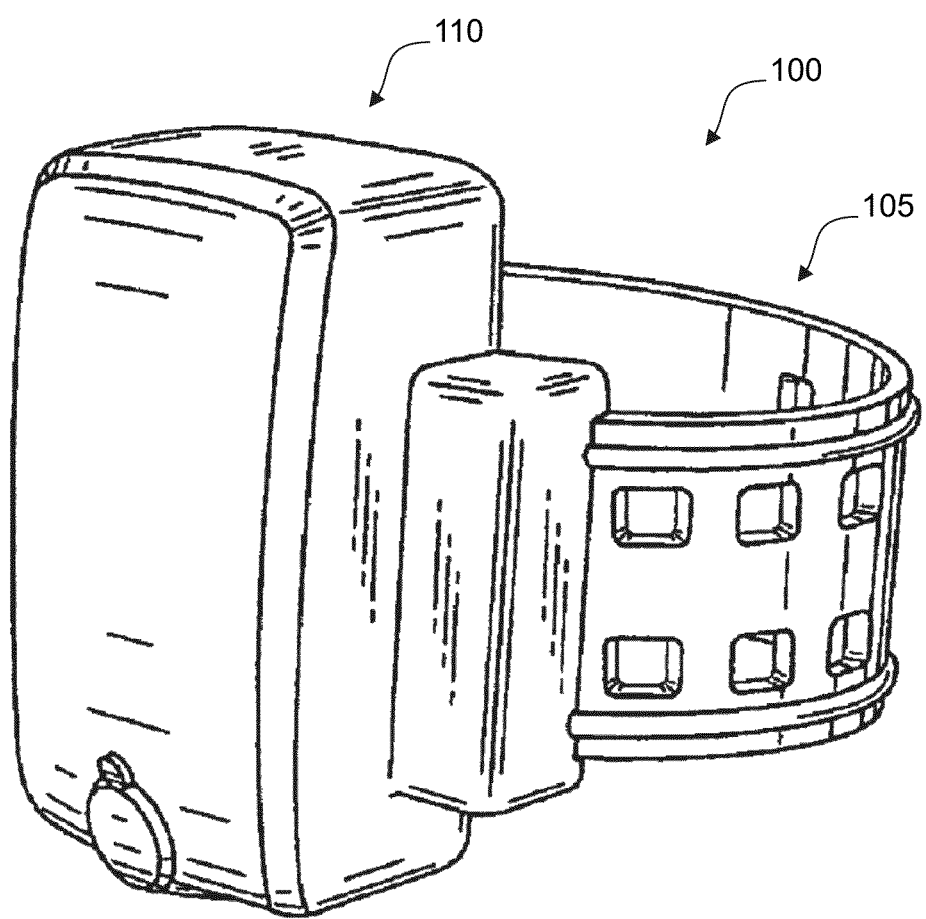
FIG. 1 is an illustration of an offender monitor in accordance with some example embodiments of the present technology.

Many aspects of the technology can be better understood with reference to the above drawings. The elements and features shown in the drawings are not necessarily to scale, emphasis being placed upon clearly illustrating the principles of exemplary embodiments of the present technology. Moreover, certain dimensions may be exaggerated to help visually convey such principles.

DESCRIPTION OF EXAMPLE EMBODIMENTS

A computer-based system and process can improve operations of an offender monitor by managing the frequency at which the offender monitor determines its location. The offender monitor can determine location more frequently when the offender monitor is near an area that is sensitive or prohibited than when the offender monitor is distant from the area. For example, the offender monitor can adjust the rate of location readings based on proximity to one or more geofences.

Some example embodiments of the present technology will be discussed in further detail below with reference to the figures. However, the present technology can be embodied in many different forms and should not be construed as limited to the embodiments set forth herein. Rather, these embodiments are provided so that this disclosure will be thorough and complete, and will fully convey the scope of the technology to those having ordinary skill in the art. Furthermore, all "examples," "embodiments," "example embodiments," or "exemplary embodiments" given herein are intended to be non-limiting and among others supported by representations of the present technology.

Some of the embodiments may comprise or involve processes that will be discussed below. Certain steps in such processes may naturally need to precede others to achieve intended functionality or results. However, the technology is not limited to the order of the steps described to the extent that reordering or re-sequencing does not render the processes useless or nonsensical. Thus, it is recognized that some steps may be performed before or after other steps or in parallel with other steps without departing from the scope and spirit of this disclosure.

Turning now to FIG. 1, this figure illustrates an example offender monitor 100 according to some embodiments of the present technology. The illustrated offender monitor 100 provides a representative, non-limiting example, of a tracking device.

The illustrated offender monitor 100 comprises a strap 105 that extends around an appendage of an offender who is being monitored, for example around the offender's leg or arm. The strap 105 is attached to a housing 110 that encloses electrically powered elements as discussed below. The offender may be a criminal on parole or a person under a government order for monitoring, for example. In example embodiments, the illustrated offender monitor 100 can be characterized as a tracking device for monitoring the movement of an individual.

In some example embodiments, the housing 110 can enclose various components such as one or more batteries, electronic circuitry (e.g., a transceiver, GPS locating circuitry, antenna, etc.), optical devices (e.g., a light source, a light receiver, etc.) and optical connectors. Padding can optionally be provided on the back of the housing 110 to facilitate wearing the offender monitor 100 comfortably around a leg or an arm of an individual, for example. In some embodiments, such padding is omitted. The individual can be, for example, an offender who is subject to a restraining order or house arrest from a court or other authority. One end of the strap 105 attaches to the housing 110. In installation, the other end of the strap 105 is wrapped around the individual's leg or arm and fixed to the housing 110, for example using pins or other fasteners.

In some example embodiments, the offender monitor can be worn as two separate elements. For example, a body-worn element can provide short-range monitoring/communication, while a body-attached element can comprise a cellular radio and a GPS modem.

U.S. Pat. No. 8,115,621, issued Feb. 14, 2012 in the name of Yoganand Rajala and Steve Aninye and entitled "Device for Tracking the Movement of Individuals or Objects" discloses some example embodiments of an offender monitor 100 and is hereby incorporated herein by reference.

Figure 2:
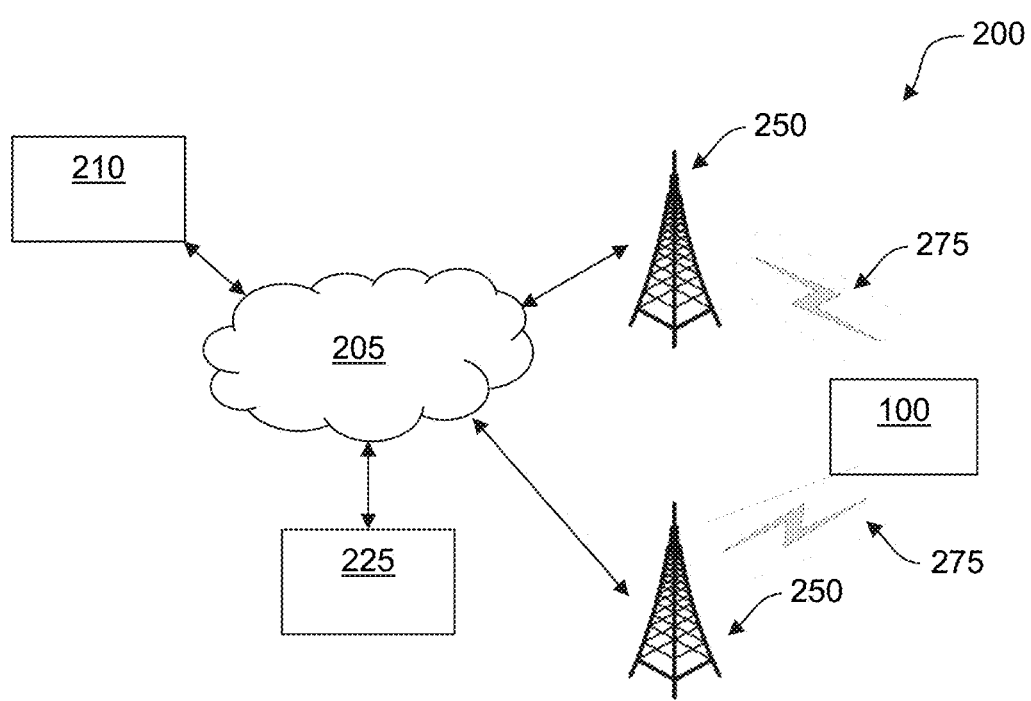
FIG. 2 is an illustration of an operating environment for an offender monitor in accordance with some example embodiments of the present technology.

Turning now to FIG. 2, this figure illustrates an example operating environment for the offender monitor 100 according to some embodiments of the present technology. In the illustrated embodiment, the operating environment comprises a cellular system 200. As illustrated, the offender monitor 100 is located near two cell towers 250 and may communicate with either via respective communication channels 275. The cell towers 250 communicate with a server 210 over a network 205. In some example embodiments, the network 205 comprises the Internet.

A user station 225 is also connected to the network 205. The user station 225 can communicate with the offender monitor 100 through the server, or alternatively directly. The user station 225 provides an interface through which a user, for example an officer such as a parole officer or official, can interact with the offender monitor 100 and the server 210. The officer may track offender movements and historical movement patterns through the user station 225, for example. In various embodiments, the user station 225 can comprise a smartphone or other handheld device, a laptop, a workstation, a personal computer, or other appropriate system.

The server 210 provides location services for the offender monitor 100 as well as for other monitors (not illustrated) that may be attached to other people or objects. Additionally, the server 210 typically stores configuration data that may be downloaded to the offender monitor 100, such as during startup or rebooting. In an example embodiment, the server 210 typically comprises an Internet connection, a processor, and memory. In some example embodiments, the server 210 can comprise a group or cluster of servers acting as a single logical entity.

Figure 3:
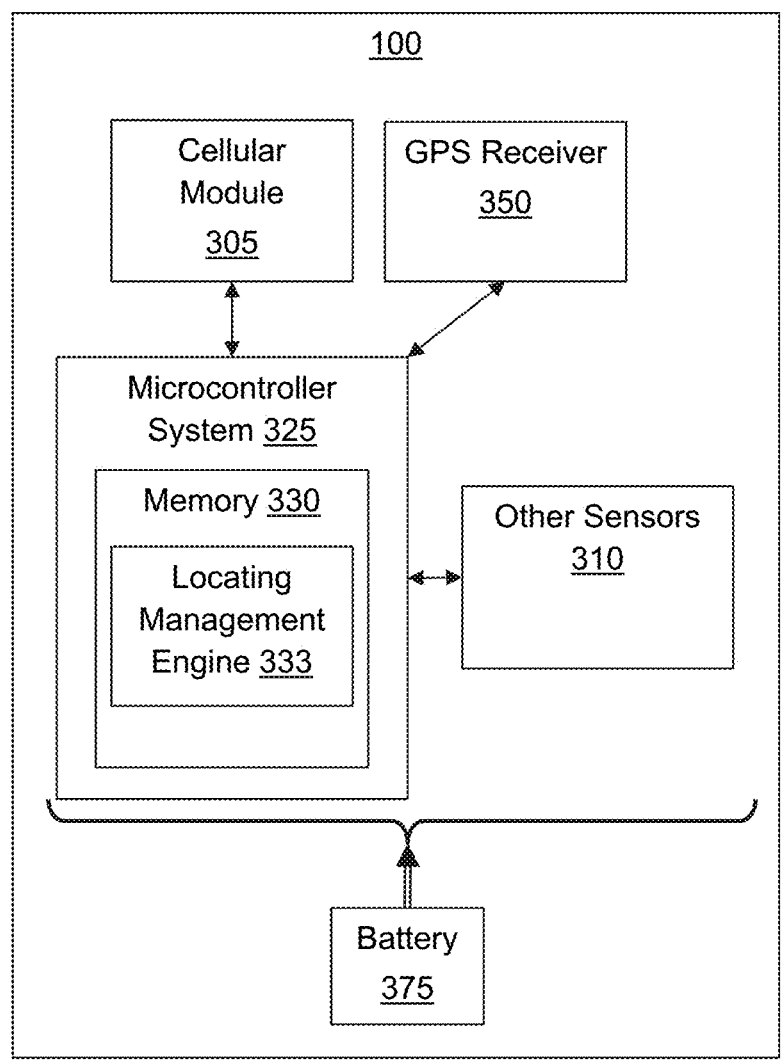
FIG. 3 is a functional block diagram of an offender monitor in accordance with some example embodiments of the present technology.

Turning now to FIG. 3, this figure illustrates a functional block diagram for the example offender monitor 100 according to some embodiments of the present technology. In the illustrated embodiment, the offender monitor 100 comprises a cellular module, a GPS receiver 350, a microcontroller system 325, and other sensors 310, all of which are powered by one or more on-board batteries 375. The cellular module 305 comprises an example embodiment of a radio. The GPS receiver 350 comprises an example embodiment of a location detector.

The other sensors 310 may include tamper detectors, orientation sensors, switches, microphones, gyroscopes, accelerometers, etc. Example tamper detectors can include switches that open or close to provide an electrical signal when the housing 310 is opened or otherwise breached, fiber optic strands that are embedded in the strap 105 to break and stop transmitting an optical signal when the strap 105 is compromised, and other appropriate tamper sensing devices.

In some example embodiments, the cellular module 305 and the GPS receiver 350 are integrated into a single modem module or chip or chip set. In operation, the cellular module 305 maintains a connection to one or more cell towers 250 over one or more wireless channels 275 through a wireless network as illustrated in FIG. 2. In an example embodiment, the cellular module 305 continuously attempts to keep a cellular connection available to the tower 250. In such an embodiment, the server 210 can control the operation of the offender monitor 100 by sending commands or other data to the monitor 100. In various embodiments, the cellular module 305 can comprise CDMA, GSM, UMTS, HSPA, or LTE technologies.

When triggered by the microcontroller system 325, a GPS location reading occurs on the GPS receiver 350. The microcontroller system 235 can further control the cellular module 305 in connection with transmitting acquired location data (GPS or otherwise), notifications, alarms, and other appropriate data and with receiving commands and other data. In some embodiments, location information is obtained utilizing cell-tower-based triangulation, such as advanced forward link trilateration (AFLT), or using a signal-strength-based location approach, such as received signal strength indicator (RSSI) based on tower or Wifi signals. The offender monitor 100 can utilize such technologies as embodiments of a location detector to augment or support, or as a substitution for, satellite-based location tracking. Further, GPS tracking can utilize assisted GPS (A-GPS) to improve location acquisition speed.

In an example embodiment, the microcontroller system 325 comprises a low-power microcontroller and associated memory 330. The microcontroller system 325 can comprise a microprocessor or other appropriate processor, for example. Example embodiments of the memory 330 can comprise volatile and nonvolatile memory, such as random access memory (RAM) and flash memory for example. In an example embodiment, the memory 330 can comprise firmware for executing management and control functions. For example, the memory 330 can comprise persistent memory that stores program code, including a locating management engine 333. An example embodiment of the locating management engine 333 comprises computer executable instructions for the utilization of the GPS receiver 350 or other location detector, such as code for process 500 that is illustrated in flowchart form in FIG. 5 and discussed below.

Figure 4:
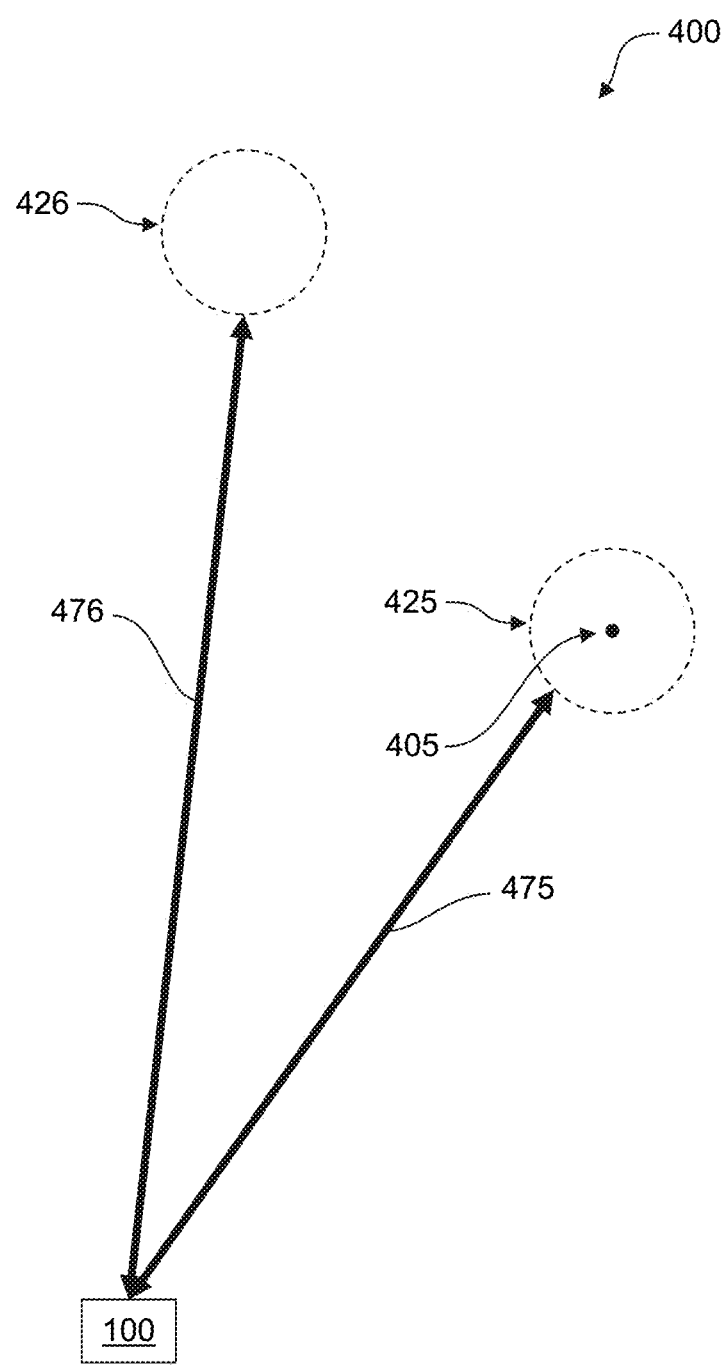
FIG. 4 is an illustration of an offender monitor separated from two geofences in accordance with some example embodiments of the present technology.

Turning now to FIG. 4, this figure illustrates an example scenario 400 in which an offender monitor 100 is spaced two distances 475, 476 from two geofences 425, 426 according to some embodiments of the present technology. Geofences 475, 476 offer useful tools for managing offenders who are under location surveillance utilizing an offender monitor 100 as a tracking device. When an offender crosses or nears a geofence 475, 476 an authority, such as a parole officer, can receive a notification.

In the illustrated embodiment, the two geofences 475, 476 are exclusionary in that that serve to exclude the offender from an area. The illustrated geofence 425 surrounds a point 405 that may represent a person, place, or thing as discussed below. The geofences 475, 476 can cause an action, for example providing a notification, when an offender violates a geofence boundary and enters a prohibited area. For example, a geofence 475, 476 can provide a boundary around a residence or workplace of a victim of the offender. As another example, an offender with a record of child abuse may be prohibited from entering an area that surrounds a school and that is defined by a geofence 475, 476. The act of the offender crossing the geofence 475, 476 to enter the area can raise an alarm or other notification.

As another example, a geofence 475, 476 can provide a protected space around a person, such as an offender's victim. When the victim moves, the geofence 475, 476 can move so that a safe zone follows and constantly surrounds the victim. In this scenario, the victim may carry a tracking device that dynamically reports the victim's location to the server 210. The server 210, in turn, can transmit the victim's location to the offender monitor 100 so the offender monitor 100 can keep track of the victim's location and take action if the offender encroaches on the victim's safe zone.

In addition to an exclusionary function, a geofence may provide an inclusionary function to establish an area that the offender is not allowed to leave. For example, a parolee's movements may be confined to a designated area that has an associated geofence. In this case, the geofence establishes an included or allowed area. If the parolee leaves the area, the parolee's parole office can receive a notification that is automatically generated when the parolee crosses the geofence.

Figure 5:
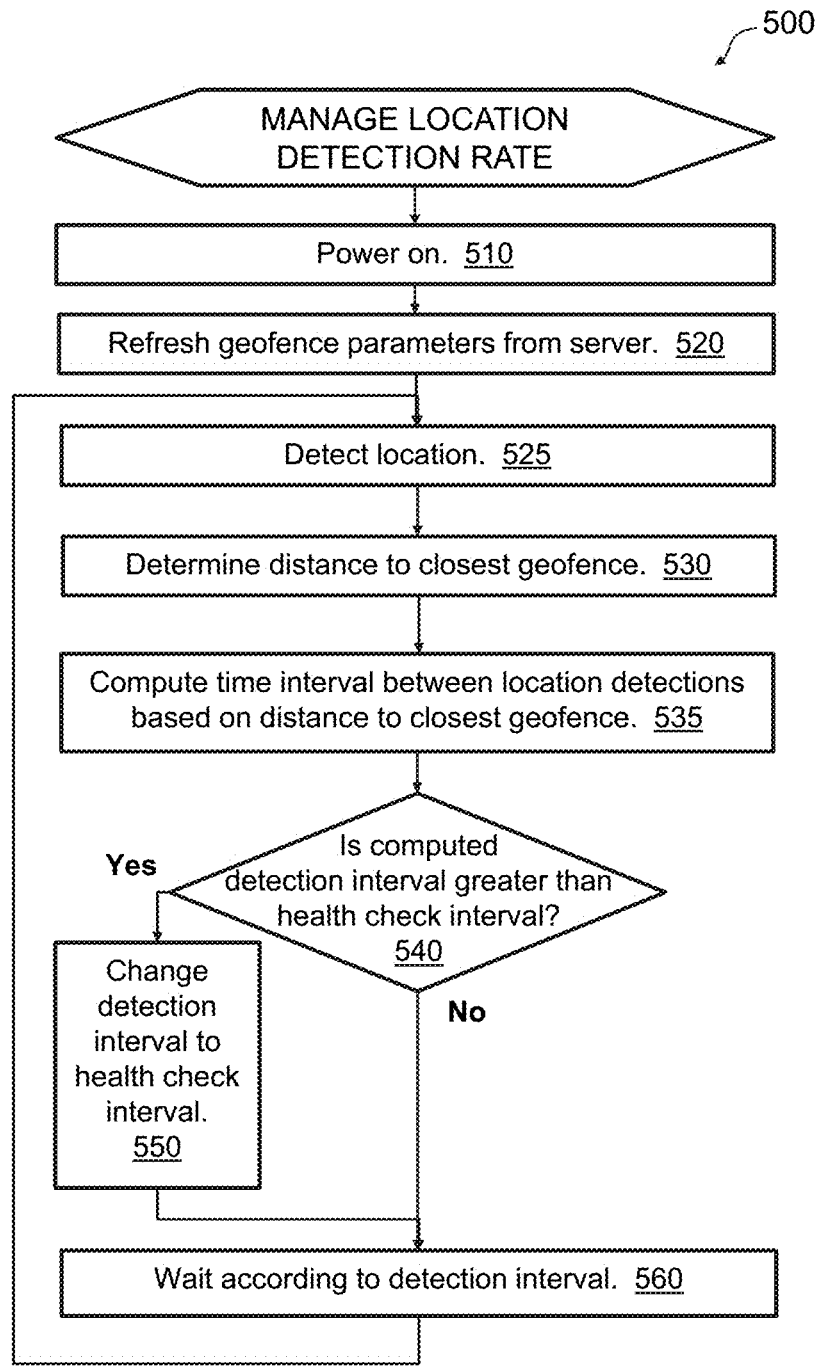
FIG. 5 is a flowchart of a process for managing location reading rate in accordance with some example embodiments of the present technology.

An example embodiment of a process 500 for managing location reading rate will now be described in further detail with reference to the flowchart illustrated in FIG. 5. Example reference will further be made to the preceding figures, without limitation. In some example embodiments, instructions for execution of the process 500 that FIG. 5 describes can be stored in the memory 330 and executed by the microcontroller system 325 of the offender monitor 100. As discussed above, process 500 can comprise an embodiment of the locating management engine 333 maintained on the memory 330.

At block 510 of process 500, the offender monitor 100 is turned on, for example during initial installation and setup or following full battery depletion/recharge or battery replacement.

At block 520 of process 500, the offender monitor 100 refreshes its configuration parameters, including location data for the geofences 425, 426 (for example geofence coordinates, sizes, geometries, etc.). The offender monitor 100 can send a message to the server 210 requesting transmission of the parameters or the parameters can be retrieved from the memory 330 upon power up, for example.

At block 525 of process 500, the offender monitor 100 detects its position. For example, the microcontroller system 325 prompts the GPS receiver 350 to take a position reading or determines position using another embodiment of a location detector.

At block 530, the offender monitor 100 compares the coordinates of its position to the coordinates of the geofences 425, 426, which were provided at block 520 as discussed above. The microcontroller system 325 determines the distances 475, 476 between the offender monitor 100 and each of the geofences 425, 426. In some embodiments, the distances 475, 476 may be computed between the offender monitor 100 and a geofence boundary, while in other embodiments, the distances are based on coordinates of a point 405 representing something protected by the geofence boundary. Based on the computed distances 475, 476, the microcontroller system 325 selects the closest geofence 425 as illustrated in FIG. 4 and notes that distance 475 for the current iteration of block 530.

At block 535, the microcontroller system 325 computes a time interval between location readings according to the distance 475. Thus, the microcontroller system 325 determines the frequency of taking a location reading using the GPS receiver 350 or using another embodiment of a location detector, which may utilize signal strength, triangulation, or another appropriate approach as discussed above.

In some embodiments, the time interval varies linearly from one reading per minute at the geofence 425 to once per day at a distance that may be set by an officer overseeing the offender, such as once per day. That distance could be 1,000 miles, 500 miles, 100 miles, 50 miles, or some other appropriate amount, for example. In some embodiments, the officer inputs a scaling factor that relates distance to time interval.

In some embodiments, the time interval between readings is determined by the microcontroller system 325 referencing a lookup table. The lookup table may be stored in the memory 330, for example. Entries of the lookup table may provide correlations between reading frequency and distance, so that as the distance 475 increases, the reading frequency decreases (and the reading interval increases).

In some embodiments, the time interval between readings increases according to one or more distance thresholds. For example, if the distance 475 is less than a specified threshold, the time interval between readings has one value, and if the distance 475 is above that threshold, then the time interval has another, greater value. Such thresholds can be set on increments of 10 miles, 100 miles, or some other value or values that an officer deems appropriate.

In one example embodiment, location readings are taken once every 5 minutes when the offender monitor 100 is approximately 1 mile outside the geofence 425, once every hour when the offender monitor 100 is approximately 100 miles outside the geofence 425, and approximately once every three hours when the offender monitor 100 is 1,000 miles outside the geofence 425.

At inquiry block 540 of process 500, the time interval computed at block 535 is compared to one or more constraints. For example, if the computed time interval is greater than the base 'health-check' time interval that the offender monitor 100 utilizes for confirming operational function of the device, then the reading interval is set to the health check interval at block 550. Thus, the health check interval is one example of an upper constraint placed on the reading time interval.

Process 500 proceeds to block 560 from block 550 and from a negative determination at block 540. At block 560, the microcontroller system 325 waits according to the time interval. For example, the microcontroller system 325 may utilize a timer or clock.

Once the designated amount of time has elapsed at block 560, process 500 loops back to block 525. A location reading is taken at block 525, and process 500 iterates.

Technology for controlling location reading rate in connection with energy conservation has been described. From the description, it will be appreciated that embodiments of the present technology overcome limitations of the prior art. Those skilled in the art will appreciate that the present technology is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present technology will appear to practitioners of the art.

What is claimed is:

1. An offender monitor comprising:
    a battery;
    a location detector;
    a radio;
    a processor that is powered by the battery and that comprises:
        a connection to the location detector;
        a connection to the radio; and
        memory; and
    processor executable instructions stored in the memory to perform the steps of:
        determining a distance between the offender monitor and a geofence by selecting the geofence from a plurality of geofences as closest to the offender monitor;
        if the distance is less than a value, then acquiring location data at a first rate; and
        if the distance is more than the value, then acquiring location data at a second rate that is less than the first rate.

2. The offender monitor of claim 1, wherein the offender monitor is operative to protect a victim from an offender, and wherein the geofence provides a boundary around the victim and moves with the victim.

3. The offender monitor of claim 1, wherein the location detector comprises a GPS receiver,
    wherein acquiring location data comprises acquiring GPS data using the GPS receiver, and
    wherein the offender monitor further comprises:
        a housing in which the battery, the GPS receiver, the radio, and the processor are disposed; and
        a strap that is sized for attaching the housing to an offender.

4. The offender monitor of claim 1, wherein acquiring location data at a second rate that is less than the first rate comprises conserving battery power.

5. An offender monitor comprising:
    a battery;
    a location detector;
    a radio;
    a processor that is powered by the battery and that comprises:
        a connection to the location detector;
        a connection to the radio; and
        memory; and
    processor executable instructions stored in the memory to perform the steps of:
        determining a distance between the offender monitor and a geofence;
        if the distance is less than a value, then acquiring location data at a first rate;
        if the distance is more than the value, then acquiring location data at a second rate that is less than the first rate, wherein the value comprises a first threshold; and
        if the distance is more than the first threshold and more than a second threshold, then acquiring location data at a third rate that is less than the second rate.

6. The offender monitor of claim 5, wherein step of determining the distance between the offender monitor and the geofence comprises selecting the geofence from a plurality of geofences as closest to the offender monitor.

7. An offender monitor comprising:
    a battery;
    a location detector;
    a radio;
    a processor that is powered by the battery and that comprises:
        a connection to the location detector;
        a connection to the radio; and
        memory; and
    processor executable instructions stored in the memory to perform the steps of:
        determining distance between the offender monitor and a geofence, the geofence selected from a plurality of geofences as closest to the offender monitor;
        acquiring location data with the location detector at a rate according to the determined distance;
        updating distance between the offender monitor and the identified geofence;
        if the updated distance is greater than the determined distance, then decreasing the rate; and
        if the updated distance is less than the determined distance, then increasing the rate.

8. The offender monitor of claim 7, wherein updating distance between the offender monitor and the geofence comprises updating distance as the geofence moves and the offender monitor is stationary.

9. The offender monitor of claim 7, wherein updating distance between the offender monitor and the geofence comprises updating distance as the geofence and the offender monitor move concurrently.

10. The offender monitor of claim 7, wherein updating distance between the offender monitor and the geofence comprises updating distance as the offender monitor moves and the geofence is stationary.

11. The offender monitor of claim 7, wherein the offender monitor further comprises:
    a housing in which the battery, the location detector, the radio, and the processor are disposed; and
    a strap that is sized for attaching the housing to an offender leg.

12. The offender monitor of claim 7, wherein decreasing the rate comprises managing battery life.

13. The offender monitor of claim 7, wherein the processor executable instructions stored in the memory are further to perform the step of:
    when the offender monitor moves closer to a different geofence in the plurality of geofences, increasing or decreasing the rate based on change in separation between the different geofence and offender monitor.

14. An offender monitor comprising:
    a battery;
    a location detector;
    a radio;
    a processor that is powered by the battery and that comprises:
        a connection to the location detector;
        a connection to the radio; and
        memory; and
    processor executable instructions stored in the memory to perform the steps of:
        computing a time interval based on distance between the offender monitor and a geofence as the offender monitor moves relative to the geofence;
        taking location readings on the time interval;

as the offender monitor moves closer to the geofence, increasing the time interval; and as the offender monitor moves farther from the geofence, decreasing the time interval.

15. The offender monitor of claim 14, wherein the offender monitor is operative to protect a victim from an offender, and wherein the geofence provides a boundary around the victim and moves with the victim.

16. The offender monitor of claim 14, wherein moving closer to the geofence comprises moving closer to a victim of an offender associated with the offender monitor, and wherein moving farther from the geofence comprises moving farther from the victim.

17. The offender monitor of claim 14, wherein the location detector comprises a GPS receiver, and wherein the offender monitor further comprises:
  a housing in which the battery, the GPS receiver, the radio, and the processor are disposed; and
  a strap that is sized for attaching the housing to an offender leg.

18. An offender monitor comprising:
a battery;
a location detector;
a radio;
a processor that is powered by the battery and that comprises:
  a connection to the location detector;
  a connection to the radio; and
  memory; and
processor executable instructions stored in the memory to perform the steps of:
  taking location readings on a time interval;
  as the offender monitor moves closer to a geofence, increasing the time interval;
  as the offender monitor moves farther from the geofence, decreasing the time interval; and
  selecting the geofence from a plurality of geofences based on relative distance to the offender monitor.

19. The offender monitor of claim 18, wherein the time interval is computed based on a distance between the offender monitor and a geofence as the offender monitor moves relative to the geofence.

20. An offender monitor comprising:
a battery;
a location detector;
a radio;
a processor that is powered by the battery and that comprises:
  a connection to the location detector;
  a connection to the radio; and
  memory; and
processor executable instructions stored in the memory to perform the steps of:
  taking location readings on a time interval;
  as the offender monitor moves closer to a geofence, increasing the time interval;
  as the offender monitor moves farther from the geofence, decreasing the time interval;
  with the offender monitor at a first location, selecting a first geofence from a plurality of geofences according to relative distance to the offender monitor and designating the first geofence as the geofence; and
  with the offender monitor at a second location, selecting a second geofence from the plurality of geofences according to relative distance to the offender monitor and designating the second geofence as the geofence.

21. The offender monitor of claim 20:
wherein the time interval is computed based on distance between the offender monitor and a geofence as the offender monitor moves relative to the geofence, and wherein the processor executable instructions stored in the memory are further to perform the step of selecting the geofence from a plurality of geofences based on relative distance to the offender monitor.

* * * * *